United States Patent [19]

Suzumura

[11] Patent Number: 5,042,577
[45] Date of Patent: Aug. 27, 1991

[54] EVAPORATOR

[75] Inventor: Keiji Suzumura, Toyota, Japan

[73] Assignee: Aisin Seiki Kabushiki Kaisha, Kariya City, Japan

[21] Appl. No.: 491,443

[22] Filed: Mar. 8, 1990

[30] Foreign Application Priority Data

Mar. 9, 1989 [JP] Japan .................................. 1-54920

[51] Int. Cl.⁵ .............................................. F28D 1/03
[52] U.S. Cl. ..................................... 165/153; 165/176
[58] Field of Search ......................... 165/153, 167, 176

[56] References Cited

U.S. PATENT DOCUMENTS

| 3,240,268 | 3/1966 | Armes | 165/167 |
| 4,002,201 | 1/1977 | Donaldson | 165/140 |
| 4,081,025 | 3/1978 | Donaldson | 165/140 |
| 4,860,823 | 8/1989 | Noguchi | 165/153 |
| 4,867,486 | 9/1989 | Fukata et al. | 165/176 X |

FOREIGN PATENT DOCUMENTS 52-37255  3/1977  Japan .
62-46195  2/1987  Japan .
62-119379 5/1987  Japan .

Primary Examiner—Allen J. Flanigan
Attorney, Agent, or Firm—Burns, Doane, Swecker & Mathis

[57] ABSTRACT

An evaporator is constructed so as to increaase the efficiency of the heat exchange operation and to decrease the degree of turbulence usually experienced as the coolant flows through the evaporator. A series of tube elements which are alternatingly arranged are provided as the body of the evaporator. Alternatingly arranged inlet and outlet ports at the top and bottom of the tube elements permit the flow of fluid therethrough as it is passed from the inlet conduit through the outlet conduit. An end plate arrangement securely positions the inlet and outlet conduits to the end plate which is connected with the first of the series of tube elements. Due to the connection arrangement between the inlet and outlet conduits and their fixed connection to the end plate, the coolant can flow into and out of the evaporator with an absence of turbulence.

3 Claims, 9 Drawing Sheets

EVAPORATOR

BACKGROUND OF THE INVENTION

1. Field of the Invention

This invention relates to an evaporator, especially to an evaporator for a cooling system of an automobile.

2. Description of the Related Art

In order to improve the ability of a heat exchanger in general, a coolant is routed into or through several small tubes so that a larger effective heat exchange surface of the tubes can be provided and the distance between the coolant and the wall of a tube, through which the coolant flows, is decreased. An evaporator for a cooling system, a heat exchanger, has 8-10 divisional flows to achieve the above effect. An increase in divisions of the flow, however, creates turbulence, i.e. sections of the heat exchanger where coolant does not flow smoothly. This results in bad heat distribution as a whole. Japanese Patent Laid-Open 62-119373 (1987) discloses an evaporator with a junction which divides a coolant flow into two flows before the coolant goes into the evaporator. This doubles the number of flow paths as a whole without increasing the number of flows inside the evaporator and helps to prevent coolant flows from creating turbulence. As shown in FIGS. 1 and 9 of the above publication, a junction tube 6 has two branch tubes 3A, 4A which are connected to the evaporator. The end of each branch tube has a block 3A, 4A having a punched hole d. A bent portion a is formed at the periphery of the inlet opening 10 of the evaporator body. The branch tubes are set at the bent portions of the evaporator body. The parts of the evaporator are fixedly connected to each other by brazing. However, the junction tube divides the flow at a point in front of the evaporator body, the junction tube being relatively long. The inlet and outlet tubes extend across the core of the evaporator which causes an interruption or disturbance of the air flow. Replacement of the tubes outside of the core area is a problem because of the limitation in size when used in an automobile. Further, when the tubes are brazed after the evaporator is assembled, an additional process is required and even when the tubes are brazed in the same process as assembly of the evaporator, it is difficult to braze the tubes at the right place firmly, because the tubes are long and heavy. When using welding processes to fix the tubes to the blocks, which are brazed to the evaporator body, the corrugated fins near the tubes might melt.

Japanese Patent Laid-Open Nos. 52-37255 (1977) and 62-46195 (1987) disclose an evaporator which has a coolant inlet port and outlet port at its sides. This prevents a disturbing air flow, but mechanical strength may be a problem. As shown in FIG. 3 of Japanese Patent Laid-Open 52-37255 (1977), the end of the tube is supported by brazing only at the contact portion of the end of the tube and the bend of the plate. This type of structure may not provide enough strength. FIGS. 4 to 7 of Japanese Patent Laid-Open 62-46195 discloses different ways of providing support, but the tube is supported by only one contact point to the body.

SUMMARY OF PREFERRED EMBODIMENTS OF THE INVENTION

An object of the present invention is to provide an improved evaporator overcoming the abovementioned drawbacks.

Other objects will be apparent from an understanding the invention.

In accordance with this invention, an evaporator includes a body having tube elements, corrugated fins, first and second inlet passages and first and second outlet passages. A side plate is connected to a side end of the body and has first and second inlet ports which are connected to the first and second passages, respectively. The first and second outlet ports are connected to the first and second passages, respectively. A coolant inlet tube, a coolant outlet tube, and a connecting plate are connected to the side plate and has the first connecting passage which connects the first and second inlet ports with the coolant inlet tube and the second connecting passage which connects the first and second outlet ports with the coolant outlet tube.

In accordance with this invention, the connecting plate can divide the coolant flow into two flows at an end of the evaporator. This doubles the number of flow paths without generating turbulence. The coolant inlet and outlet tubes are positioned at the side of the evaporator to prevent disturbance by the air flow. The coolant inlet and outlet tube arrangement is simplified to reduce the size of the evaporator so that the brazing process is simplified.

BRIEF DESCRIPTION OF THE DRAWINGS

The objects and advantages of the invention will become apparent from the following detailed description of preferred embodiments thereof in connection with the accompanying drawings in which.

DETAILED DESCRIPTION OF A PREFERRED EMBODIMENT OF THE INVENTION

Figure 1:
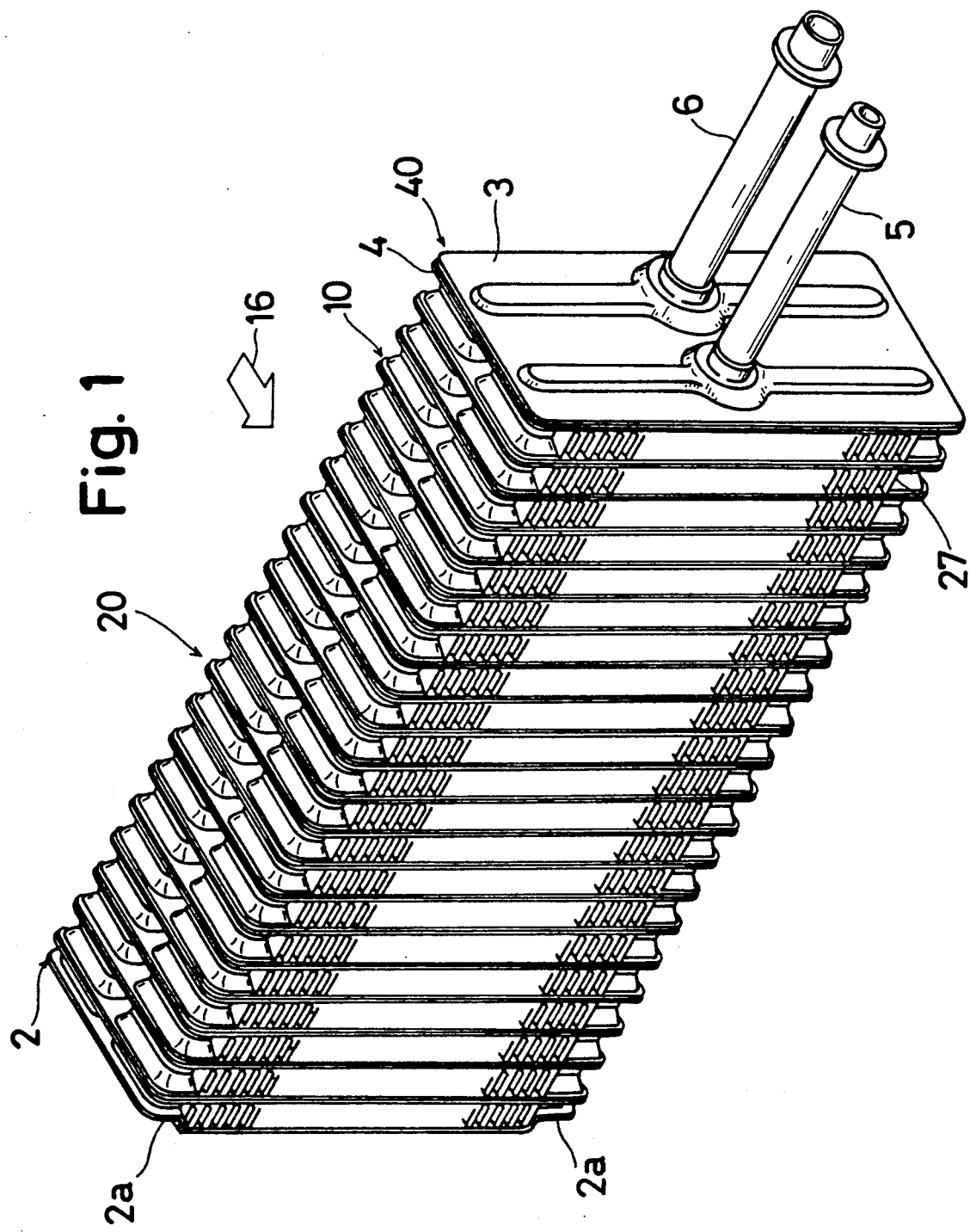
FIG. 1 is a perspective view of an embodiment of an evaporator in accordance with the present invention.
Figure 2:
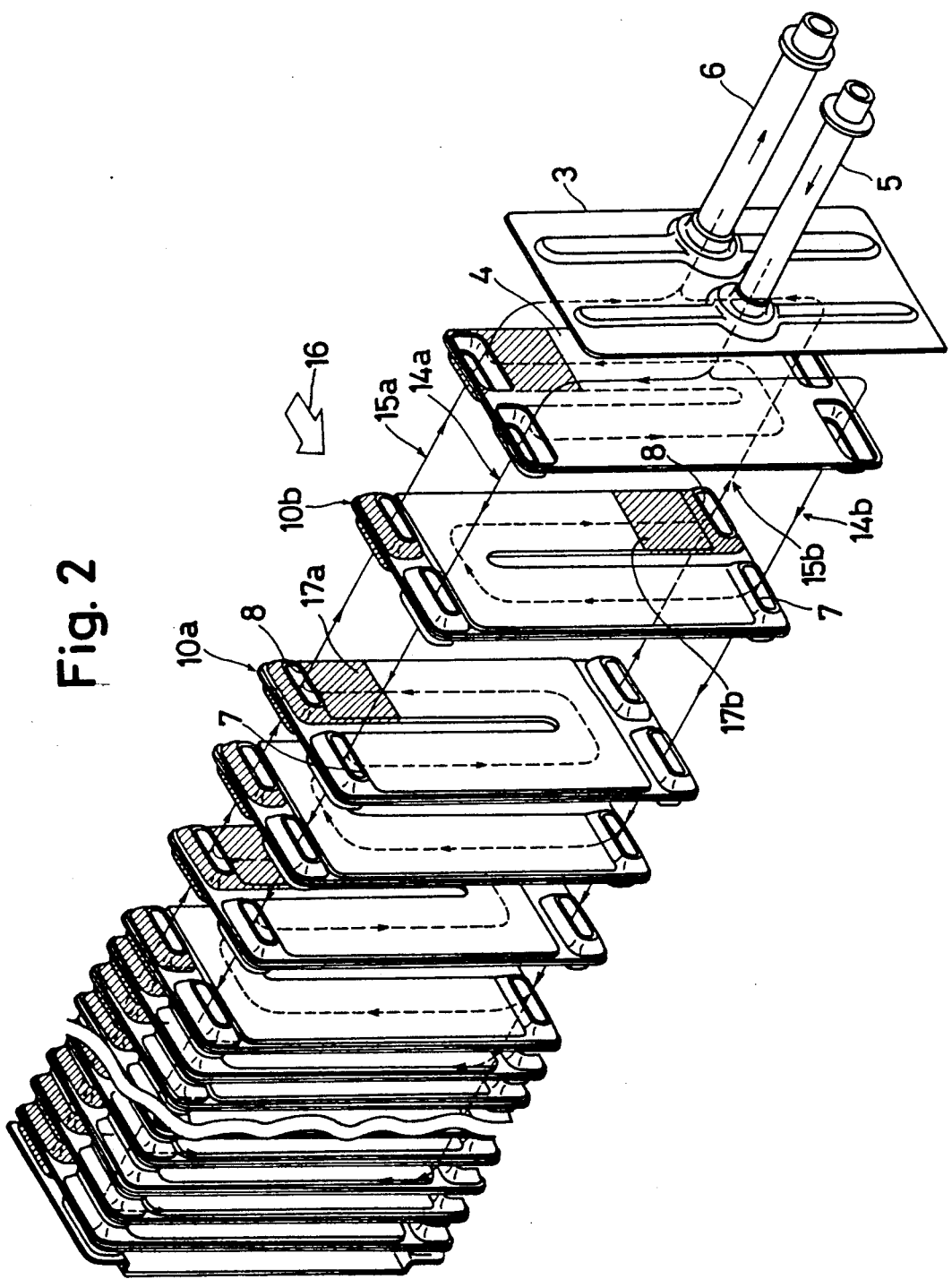
FIG. 2 is a perspective view of the evaporator of FIG. 1 showing flow of the coolant through the evaporator.
Figure 7:
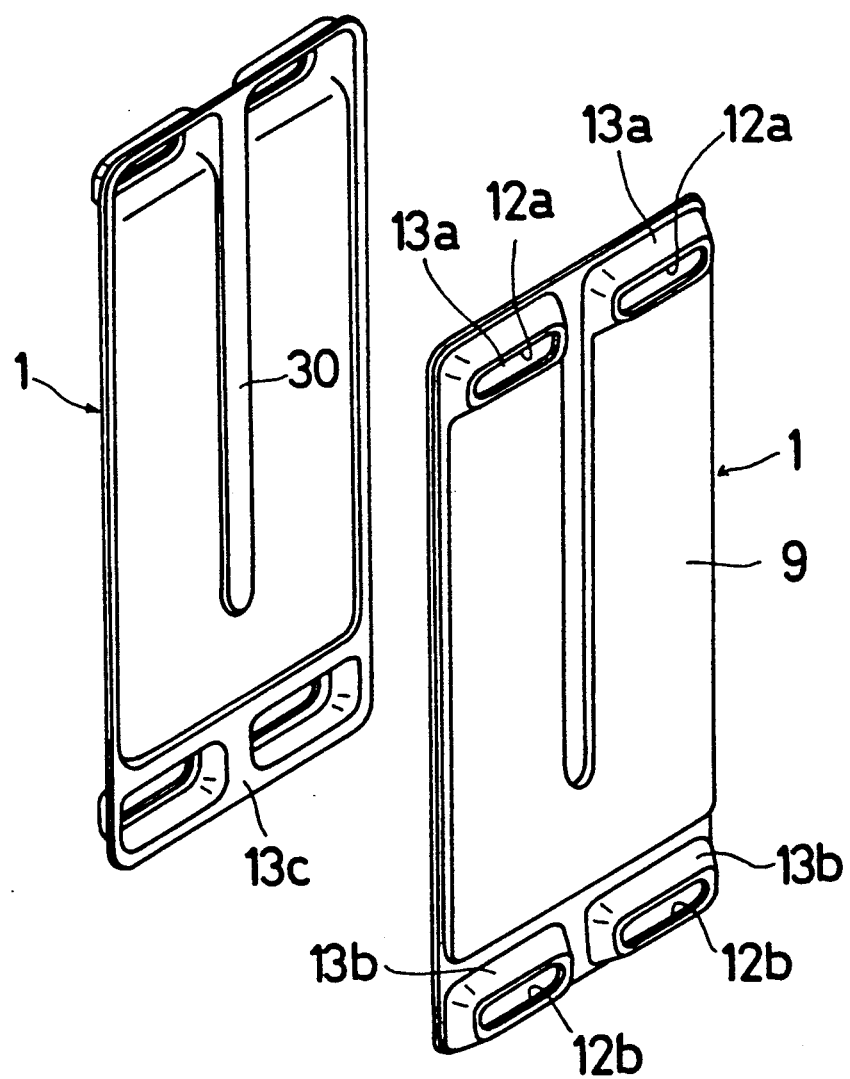
FIG. 7 is a perspective view of a tube element of the present invention.

As shown in FIG. 1, an evaporator 20 has tube elements 10 and corrugate fins 27 which are connected thereto. A side plate 2 is fixed to one end of the evaporator 20 and a terminal member 40 having a flat plate 4 and distribution plate 3 is fixed to the other end of the evaporator 20. A first tube element 10a is shown in FIG. 2. The tube element 10a is provided with substantially U-shaped arm portions. FIG. 7 shows that the tube element 10a is formed by two main plates 1. Each main plate 1 has a wall section 30 which projects from one side of the plate to the other side. A U-shaped arm portion 9 is provided on the main plate 1 and projects to the opposite side of the main plate 1 with respect to the wall section 30. Each tube element 10a is formed by connecting two main plate 1 together so that the wall sections 30 of each plate face each other and the U-shaped arm portions 9 are exterior of the wall sections.

Figure 3:
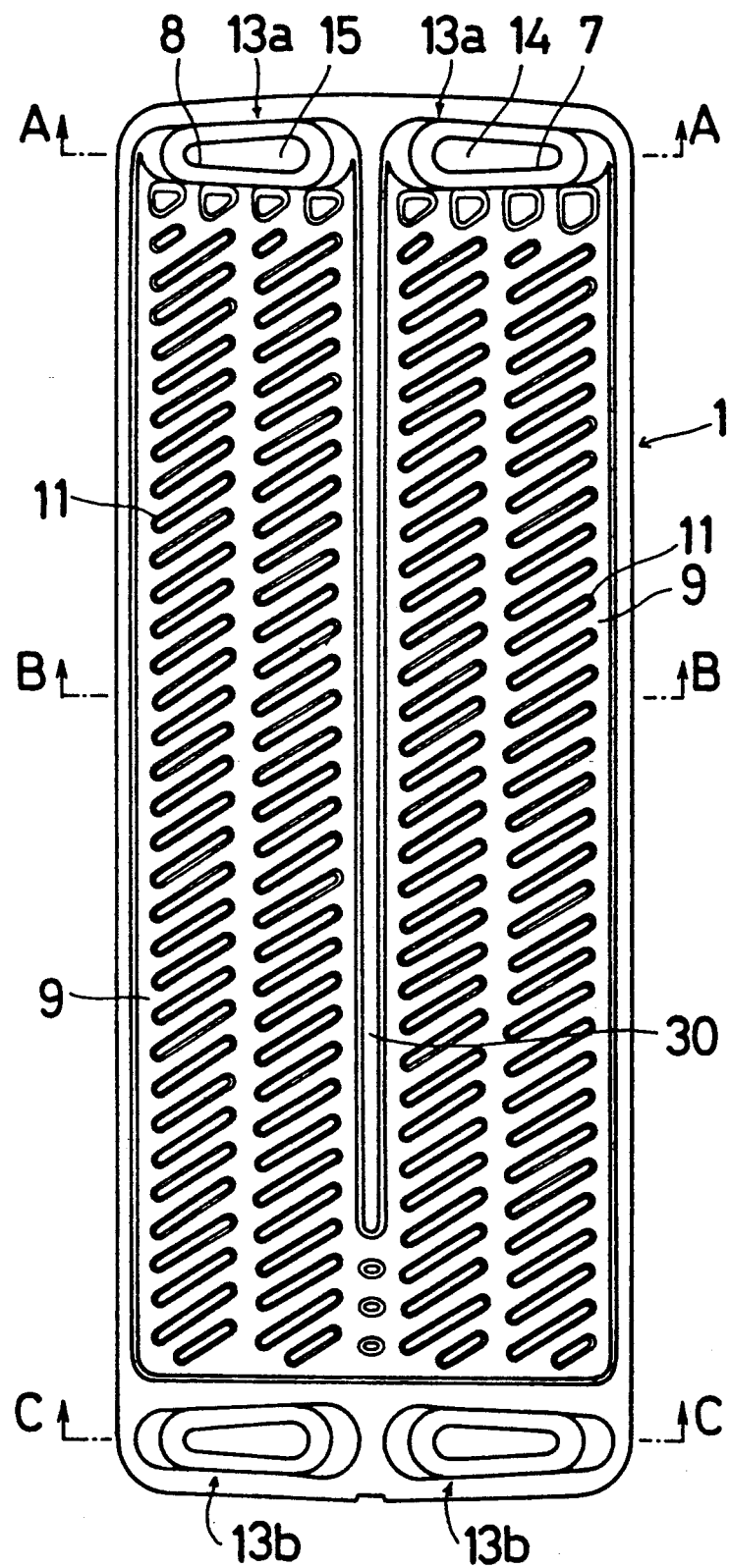
FIG. 3 is a plan view of the main plate of the evaporator of the present invention.
Figure 4A:
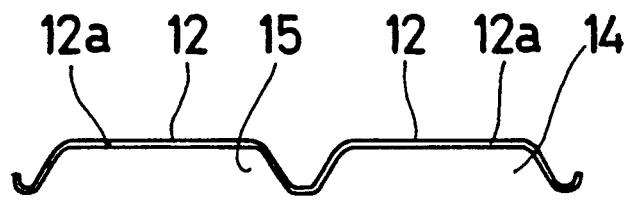
FIG. 4A is a cross-sectional view of the main plate along with the lines A—A and C—C in FIG. 3 of the present invention.
Figure 4B:
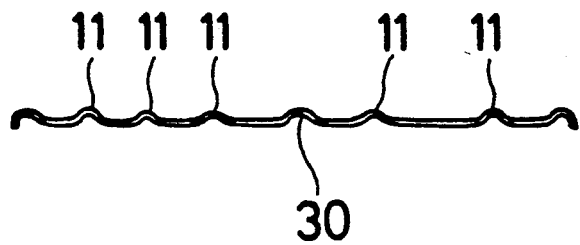
FIG. 4B is a cross-sectional view of the main plate along with the line B—B in FIG. 3 of the present invention.

FIG. 3 shows a plan view of the main plate 1. The main plate 1 has a coolant inlet port 7 and a coolant outlet port 8 each of which is positioned adjacent the ends of U-shaped arm portions 9. The U-shaped portion 9 has slanted raised ribs 11 which project inwardly from the U-shaped arm portion 9 and arranged on each side of the wall section 30 so as to increase heat exchange efficiency. The main plate 1 is provided with projections 12 at the top and the bottom of the main plate 1, respectively. The projections 12 form protruding pockets 13a and 13b when the two main plates 1 are connected together. The pockets 13a at the top of the tube element 10a form projections 12 provided with openings 12a and 12b. The openings 12a at the top of the tube element 10a define the inlet port 7 and the outlet port 8. The tanks 13b at the bottom of the tube element 10a are isolated from the U-shaped portion 9 due to mating interior surfaces 13c of each main plate 1.

The second tube element 10b as shown in FIG. 2 is identical to the first tube element 10a except that it is positioned upside down. Thus the inlet and outlet ports 7 and 8 are provided at the bottom of the tube element 10b and the pockets 13b are provided at the top of the tube element 10b.

A plurality of first and second tube elements 10a and 10b are alternately positioned as shown in FIG. 2. The pockets 13a and 13b are connected together as shown in FIG. 1 so the openings 12a and 12b are connected. Thus a coolant distribution passage 14 and a coolant collection passage 15 are established. The distribution passage 14 is located at the lower side of the air flow indicated by the arrow 16 in FIG. 2. The collection passage 15 is located at the upper side of the air flow. Because the diameter of the passages 14 and 15 is larger than the diameter of the rest of the U-shaped tube, flow resistance of the passages 14 and 15 is very small so that turbulence is prevented.

The side plate 2 has step portions 2a which cover the openings 12a and 12b at one end of the tube element 10. The side plates 2 also protect the evaporator.

Figure 5A:
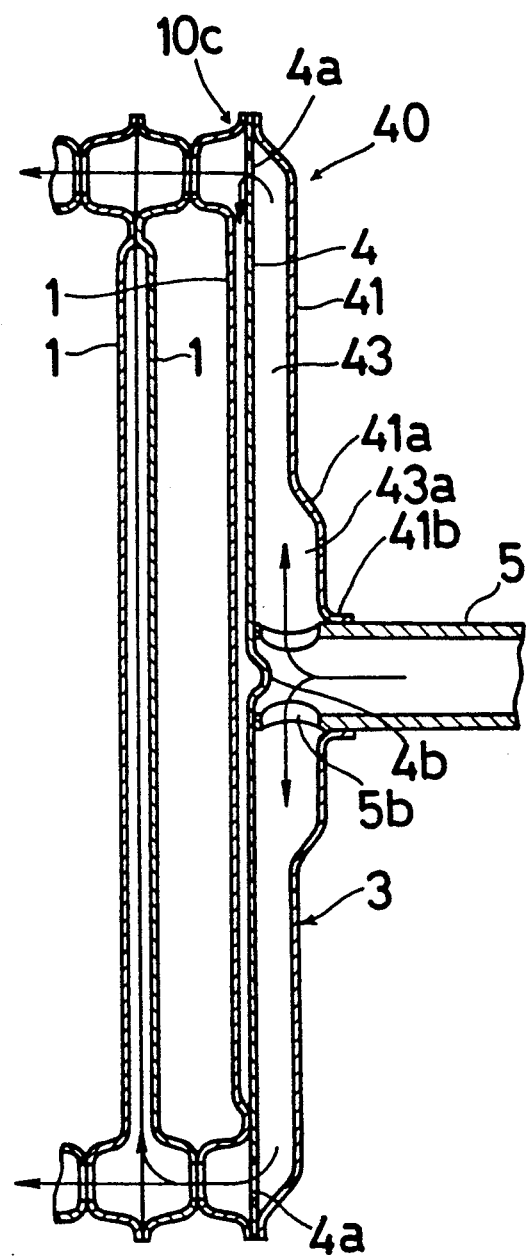
FIG. 5A is a cross-sectional view of a side plate of the evaporator of the present invention.
Figure 5B:
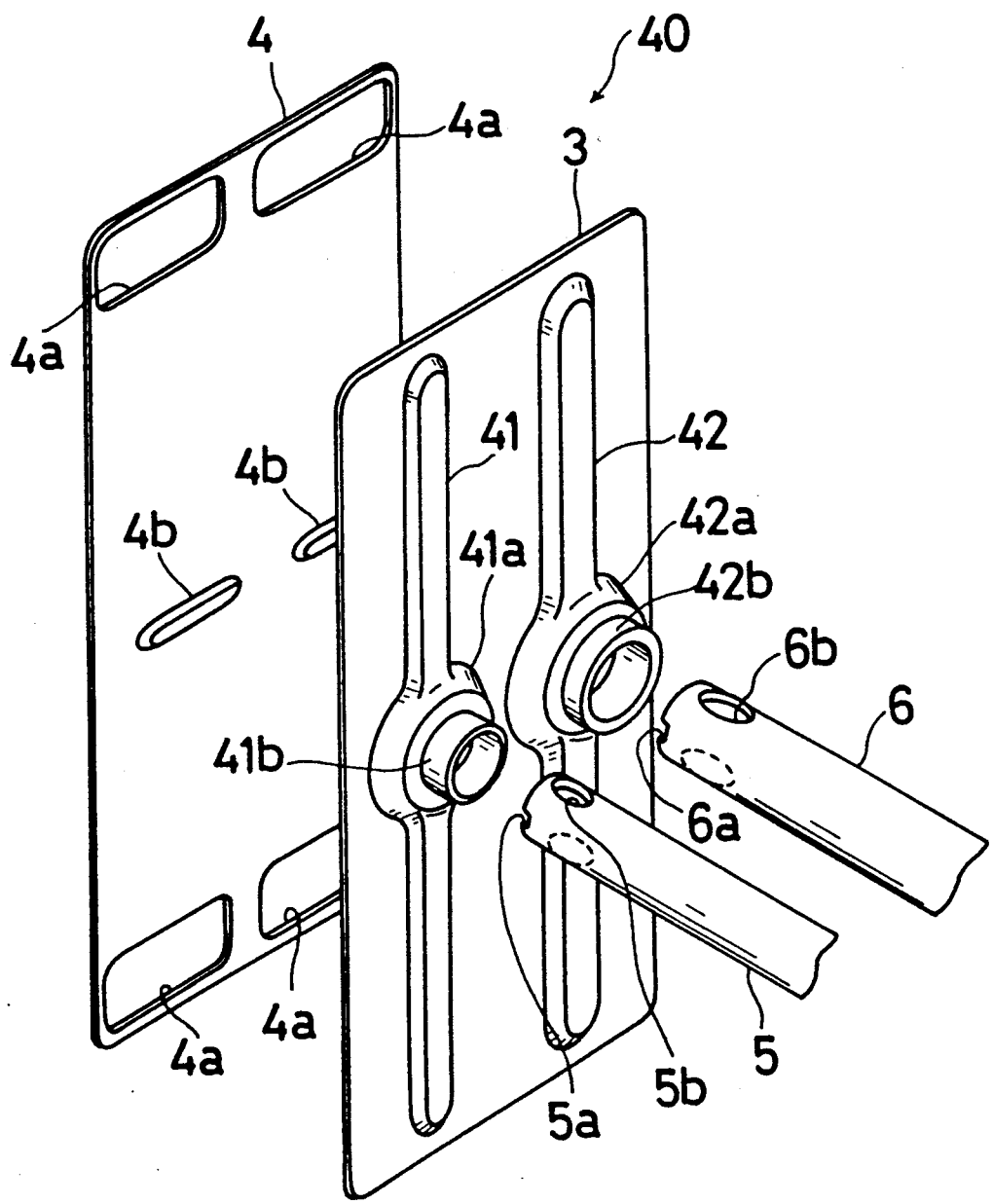
FIG. 5B is a perspective view of the side plate shown in FIG. 5A.

FIGS. 5A and 5B show the terminal member 40. The terminal member 40 comprises a flat plate 4 and a connecting plate 3. The flat plate 4 is provided with openings 4a. The openings 4a are in alignment with the distribution and collection passages 14 and 15 of the tube element. As shown in FIG. 5A, the flat plate 4 is fixed to the main plate 1 with the openings 4a facing the pockets of the main plate 1. At the middle portion of the flat plate 4, ribs 4b are provided to support the inlet and outlet tubes 5 and 6. The connecting plate 3 has a projection extension 41 extending from the top opening 4a to the bottom opening 4a of the connecting plate 3. Parallel to the extension 41, a projection extension 42 extends from the top opening 4a to the bottom opening 4a of the connecting plate 3. The extensions 41 and 42 provide passages 43 between the ends of the flat plate 4. Each passage 43 is separated from the other. The passages 43 communicate between the distribution passages 14 and the collection passages 15 at the top and bottom of the flat plate 4. In the middle of the project members 41 and 42, at a position corresponding to the ribs 4b of the flat plate 4, bosses 41a and 42a are provided. The bosses 41a and 42a have raised ring portions 41b and 42b, respectively. The ring portions 41b and 42b are provided to support the inlet and outlet tubes 5 and 6. At the end of the inlet and outlet tubes 5 and 6, cut-out portions 5a and 6a, as shown in FIG. 5B, which engage with the ribs 4b. The inlet and outlet tubes 5 and 6 have openings 5b and 6b which communicate with the passages 43. The openings 5b and 6b are substantially elliptically shaped and the length of the major axis is substantially the same as the length of the enlarged portion 43a of the passage 43 as shown in FIG. 5A.

When assembling the parts by brazing, the connecting plate 4 is placed horizontally on the flat plate 3 then the inlet and outlet tubes are vertically inserted into the ring portions 41b and 42b. The inlet and outlet tubes 5 and 6 are guided by the ring portions 41b and 42b when inserted. The cut-out portions 5a and 6a of the inlet and outlet tubes 5 and 6 are interconnected with the ribs 4b of the flat plate 4 then the tubes are correctly positioned. A brazing process fixes the tubes 5 and 6 to the connecting plate 3. In this way, the weight of the tube is vertically directed so that the tubes can be firmly fixed to connecting plate. Since the tubes 5 and 6 are supported by two points, i.e., ribs 4b and ring portion 41b and 42b, tube support strength is greatly increased. The ribs 4b provide correct placement of the tubes 5b, 6b are correctly positioned. This decreases unnecessary fluid resistance in the passage 43 to assist in the prevention of turbulence.

Figure 6A:
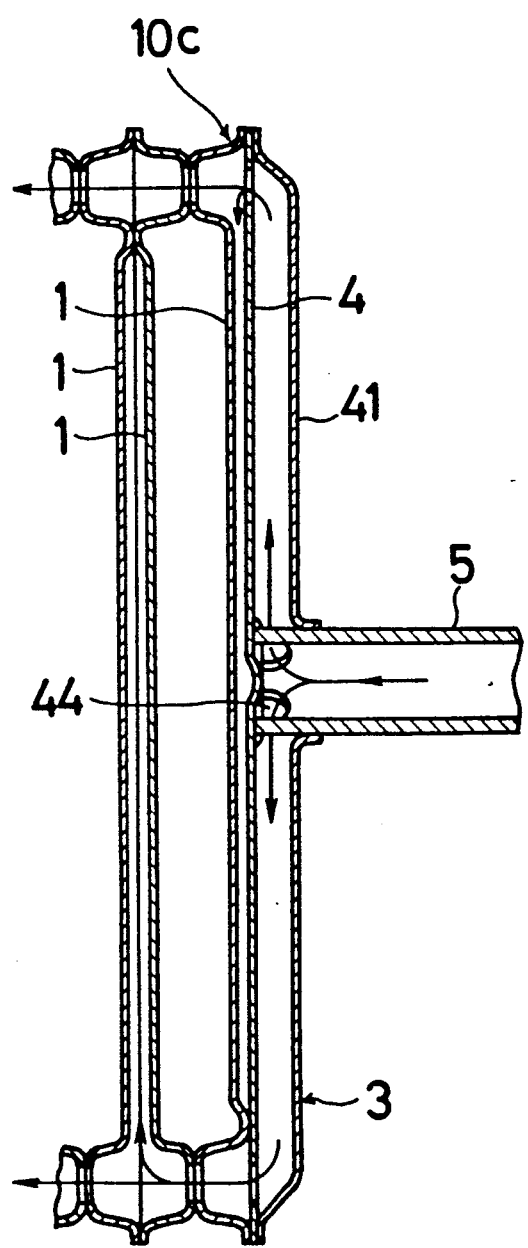
FIG. 6A is a cross-sectional view of the side plate means of the evaporator of another embodiment of the present invention.
Figure 6B:
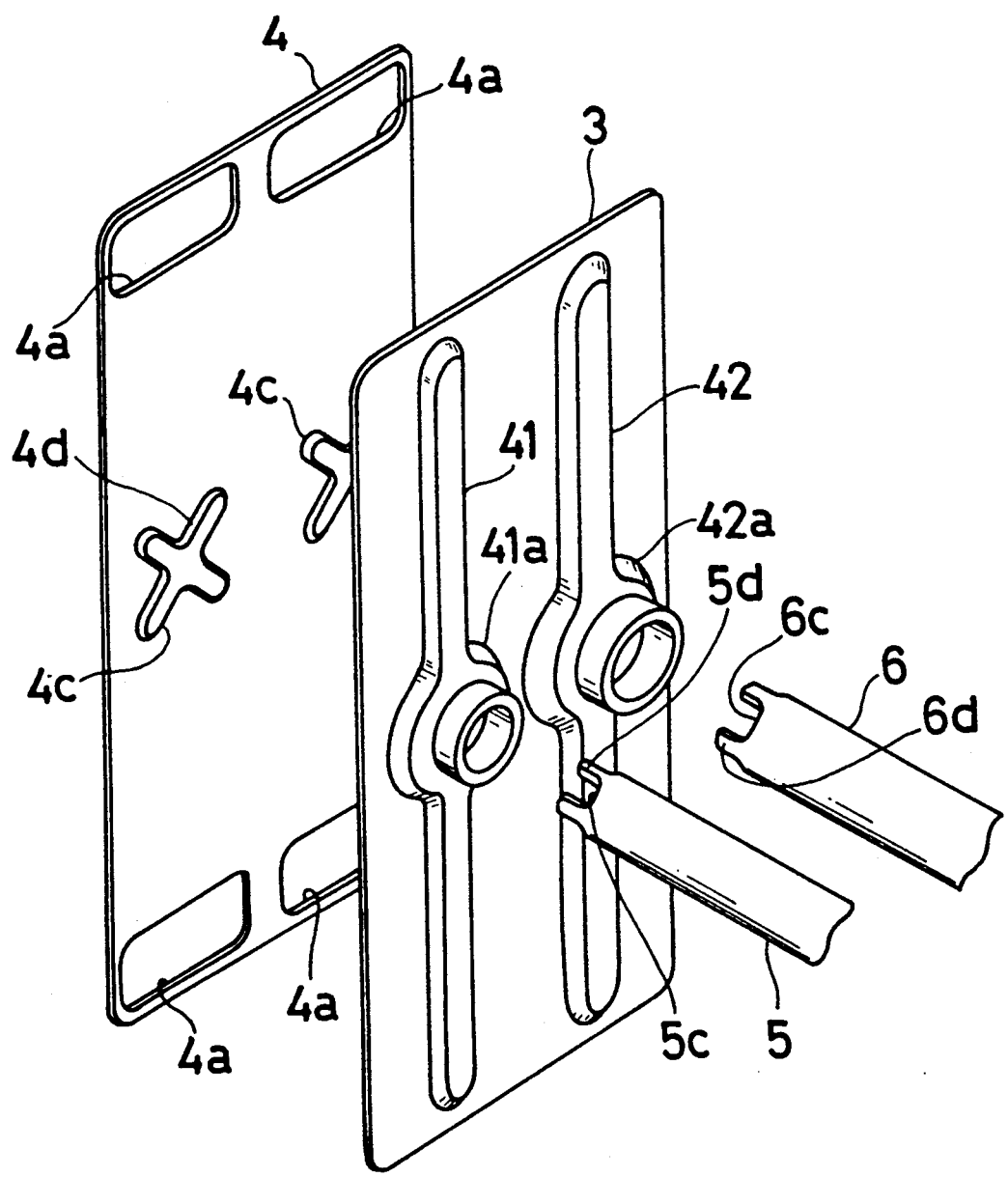
FIG. 6B is a perspective view of the side plate shown in FIG. 6A.

FIGS. 6A and 6B show another embodiment of the present invention. The tubes of this embodiment have portions which operate as both a fluid passage and a support member. Referring to FIGS. 6A and 6B, the flat plate 4 has two ribs 4c in cross-shape. The tubes 5 and 6 have four cut portions 5c and 6c and four leg portions 5d and 6d, respectively. The depth of the cut portions is greater than the height of the ribs 4c so that an opening 44 is formed when the tube is fixed to the ribs 4c. The four cut portions of the tube provide a sufficient fluid passage to reduce the fluid resistance. The four leg portions 5b contact the crossing portion 4d of the rib 4c so as to support the leg portions 5b. This type of contact increases the strength of the brazing connection.

In accordance with the above, the evaporator 20 is made of thermally conductive material and each part is made by press processing of thin metal plates. Brazing material covers the pressed shaped plates. The assembled parts are put into a brazing oven at a temperature of about 600° centigrade. Thus, the evaporator 20 is assembled by brazing the assembled parts into a unitary body.

Referring to FIG. 2, the flow of the coolant is explained hereinafter. The coolant, compressed by a condenser, is transmitted to the evaporator through an expansion valve and receiver. The coolant is introduced into the evaporator by the inlet tube 5 which is located on the downstream side of the air flow indicated by the arrow 16 in FIG. 2. The coolant goes into the connecting panel 3, is divided into two flows by the passage 43, and then goes into the distribution passage 14. The distribution passage 14 of a series of the pockets 13 is divided into the first tube 10a and the second tube 10b. The coolant is equally divided into each tube element 10 and then flows into and through the U-shaped passage. When the coolant goes through the tube element, the coolant evaporates by absorbing the heat from the air flow through the ribs 11 and the corrugated fins 27. The air flow from the evaporator is cooled from passing through the ribs and fins. The evaporating temperature of the coolant is set to approximately 0° centigrade to prevent the evaporator from freezing. The evaporated coolant is gathered in the collection passage 15 then transferred to the outlet tube 6 through the passage 43. The temperature of the output coolant is set to be about 5° to 10° centigrade higher than the evaporating temperature by the expansion valve (not shown) to prevent the compressor (not shown) from breaking.

The coolant introduced into the distribution passage 14b goes into the tube element 10b through the opening 7. Then the coolant flows into the collection tube 15b through the U-shaped passage and the outlet port 8. At the region of the outlet port 8, an area 17b of super heat is generated but is spread to the coolant of the collection passage 15b. The coolant introduced into the distribution passage 14a goes into the tube element 10a through the opening 8. Then the coolant flows into the collection tube 15a through the outlet port 8. At the vicinity of the outlet port 8 an area 17a of super heat is generated but is spread to the coolant of the collection passage 15a. In the series of tube elements, the areas of super heat are alternatingly positioned to prevent the evaporator from overheating.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An evaporator comprising:
   a first tube element having first and second inlet ports, first and second outlet ports and an inner passage which connects said first inlet port with said first outlet port;
   a second tube element having a third inlet port connected to said first inlet port, a third inlet port connected to said first outlet port, a fourth inlet port connected to said second inlet port, a fourth outlet port connected to said second outlet port and a second inner passage which connects said fourth inlet port with said fourth outlet port;
   plate means comprising a flat plate and a connecting plate connected to one of said first and second tube elements;
   a coolant inlet port connected to said connecting plate;
   a coolant outlet port connected to said connecting plate;
   a first connecting passage provided at said connecting plate, connecting said first and second inlet ports and said coolant inlet port;
   a second connecting passage provided at said connecting plate, connecting said first and second outlet ports and said coolant outlet port;
   projection means provided on said flat plate;
   a coolant inlet tube having a recess connecting with said projection means when said coolant inlet tube is inserted into said coolant inlet port of said connecting plate; and
   a coolant outlet tube having a recess connecting with said projection means when said coolant outlet tube is inserted into said coolant outlet port of said connecting plate.

2. An evaporator according to claim 1, further comprising reciprocally alternating areas of super heat in the first and second tube elements, the areas of super heat being at substantially right angles to air flow direction.

3. An evaporator according to claim 1, further comprising an opening in said coolant inlet tube and an opening in said coolant outlet tube so as to provide fluid communication between said tubes and said passages.

* * * * *